United States Patent
Suriyachai et al.

(10) Patent No.: US 10,696,822 B2
(45) Date of Patent: Jun. 30, 2020

(54) PROCESS FOR FRACTIONATION OF LIGNOCELLULOSIC BIOMASS

(71) Applicant: PTT Global Chemical Public Company Limited, Bangkok (TH)

(72) Inventors: Nopparat Suriyachai, Phayao (TH); Verawat Champreda, Bangkok (TH); Navadol Laosiripojana, Bangkok (TH)

(73) Assignee: PTT GLOBAL CHEMICAL PUBLIC COMPANY LIMITED, Bangkok (TH)

( * ) Notice: Subject to any disclaimer, the term of this patent is extended or adjusted under 35 U.S.C. 154(b) by 80 days.

(21) Appl. No.: 15/773,823

(22) PCT Filed: Nov. 14, 2016

(86) PCT No.: PCT/TH2016/000092
§ 371 (c)(1),
(2) Date: May 4, 2018

(87) PCT Pub. No.: WO2017/086887
PCT Pub. Date: May 26, 2017

(65) Prior Publication Data
US 2018/0319959 A1 Nov. 8, 2018

(30) Foreign Application Priority Data
Nov. 16, 2015 (TH) .................. 1501006873

(51) Int. Cl.
| | |
|---|---|
| C08L 5/14 | (2006.01) |
| C08L 97/02 | (2006.01) |
| C08B 37/00 | (2006.01) |
| C08H 8/00 | (2010.01) |
| B01D 11/04 | (2006.01) |

(52) U.S. Cl.
CPC ............ *C08L 5/14* (2013.01); *C08B 37/0057* (2013.01); *C08H 8/00* (2013.01); *C08L 97/02* (2013.01); *B01D 11/04* (2013.01); *C08L 2201/06* (2013.01); *Y02E 50/343* (2013.01)

(58) Field of Classification Search
CPC ... C08L 5/14; C08L 97/02; C08H 8/00; C08B 37/0057
See application file for complete search history.

(56) References Cited

U.S. PATENT DOCUMENTS

| | | |
|---|---|---|
| 2012/0282465 A1 | 11/2012 | Kadam et al. |
| 2013/0078698 A1 | 3/2013 | Lali et al. |

FOREIGN PATENT DOCUMENTS

| | | |
|---|---|---|
| WO | 2014132056 A1 | 9/2014 |
| WO | WO 2014/132056 A1 * | 9/2014 |
| WO | 2015009145 A1 | 1/2015 |
| WO | WO 2015/009145 A1 * | 1/2015 |

OTHER PUBLICATIONS

International Search Report and Written Opinion from PCT/TH2016/000092 dated Oct. 25, 2017.

* cited by examiner

*Primary Examiner* — Robert D Harlan
(74) *Attorney, Agent, or Firm* — Warner Norcross + Judd LLP

(57) ABSTRACT

This invention aims to develop a process for fractionation of lignocellulosic biomass by contacting lignocellulosic biomass with treatment liquid in close system at temperature not over 200° C. and pressure of 5 to 20 bars, wherein said treatment liquid comprises water-miscible part that comprising formic acid, alcohol, and water and water-immiscible part that comprising alkyl acetate. The lignocellulosic biomass may be selected from rice straw, bagasse, corncobs, corn stem, palm waste, grass, pineapple shell, bamboo, or mixture thereof.

20 Claims, 10 Drawing Sheets

PROCESS FOR FRACTIONATION OF LIGNOCELLULOSIC BIOMASS

TECHNICAL FILED OF THE INVENTION

This present invention relates to develop a process for fractionation of lignocellulosic biomass by contacting lignocellulosic biomass with treatment liquid in close system at temperature not over 200° C. and pressure of 5 to 20 bars, wherein the treatment liquid comprises water-miscible part, comprising formic acid, alcohol, and water, and water-immiscible part, comprising alkyl acetate. The lignocellulosic biomass may be selected from rice straw, bagasse, corncobs, corn stem, palm waste, grass, pineapple shell, bamboo, or mixture thereof.

BACKGROUND OF THE INVENTION

At present, the production of biofuel and basic chemicals from agricultural biomass as substitution for the production from petroleum raw material receives much attention because it is one way to reduce greenhouse gas emission into atmosphere and can be considered as carbon neutral. The integrated biorefinery process including fuel, chemicals, materials, and energy production from biomass and their by-products in near-zero waste process is developed in order to maximize adding value to the raw materials. This way has gained more interests and has possibilities in both technical and economic aspects.

All plant-based biomasses including hardwood, softwood, and agricultural waste have lignocellulosic chemical structure which comprises 3 main components; (1) cellulose, which is linear polymer of glucose connected with 1,4-beta glycosidic bond and arranging in orderly fiber with high crystallinity; (2) hemicellulose, which is amorphous branch polymer composed mainly of pentose sugar such as xylose and arabinose and hexose sugar such as glucose, mannose, and galactose, including their derivatives which function as interface in plant cell wall; and (3) lignin, which is polymer of phenolic compounds arranging in three dimensional structure, functioning in providing strength to plant cell wall, including other components such as proteins, lipids, and minerals. This lignocellulosic structure is strong and tolerance to the physical, chemical and biological degradation.

Chemical fractionation of lignocellulosic biomass is an important step in integrated biorefinery for increasing value of all biomass components which will be converted to various forms of target products. This fractionation can be performed in many ways. One effective way is organosolv since it gives high specificity for fractionating biomass components and can be applied to various raw materials such as hardwood, softwood, and agricultural waste. Biomass and Bioenergy (2011), 36, 4197-4208 disclosed clean fractionation or organosolv fractionation method which is the method for fractionating lignocellulosic biomass components in one step. The lignocellulosic material is separated with single phase solvent comprising water, ethanol, and isobutyl ketone under specific ratio at high temperature in the presence of sulfuric acid catalyst. Then, water was added into the system causing phase separation of an aqueous phase containing hemicellulose and its derivatives, an organic phase or ketone containing lignin, and an solid phase containing high purity cellulose. This process had been further studied and developed by many researches such as Bioresource Technology (2013), 127, 92-99 disclosed fractionation process of lignocellulosic biomass for ethanol production using organic solvent comprising ethyl acetate, ethanol and water in the presence of sulfuric acid as a catalyst.

Patent document U.S. Pat. No. 5,730,837 disclosed the one-step fractionation of lignocellulosic biomass at elevated temperature in the mixture of water, alcohol, and ketone in the presence of strong acid such as sulfuric acid or phosphoric acid as a catalyst. This process could fractionate hemicellulose and its derivatives in water-alcohol, lignin in ketone, and cellulosic solid. This work aimed to obtain cellulose for paper pulp production, or cellulose derivatives in polymeric form. However, sulfuric acid is a strong acid which could react with lignocellulose leading to by-product formation and the lower yield of the desired product. Moreover, sulfuric acid is corrosive substance that can damage the equipment of the system.

Patent document WO2013162881 disclosed the fractionation of lignocellulosic biomass to obtain sugar and lignin by contacting biomass with acetic acid which is weak acid, and washed the resulting cellulosic solid with acid-miscible organic solvent such as ethyl acetate. The soluble hemicellulose and lignin enriched fraction is subjected to further separation to obtain sugars and lignin. However, the process according to this patent document was complicated since it needs many steps for obtaining sugar and lignin.

Patent document WO2015009145 disclosed the fractionation of lignocellulosic using treatment liquid containing non-hydroxylic organic solvent, water, and sulfuric acid. Said document claimed that the use of high amount of hydroxyl solvent such as alcohol can give side-reaction and undesired contaminants such as glucoside, xyloside, or pseudo-lignin, etc., which results in the low product purity.

From all above, this invention aims to develop the one-step fractionation process of lignocellulosic biomass using treatment liquid comprising weak acid for fractionating biomass with high specificity and efficiency in order to obtain cellulose, hemicellulose, and lignin with high yield and purity, suitable for commercial utilization. Moreover, acids and solvents can be reused without corrosion to the equipment, leading to cost reduction of production process.

SUMMARY OF THE INVENTION

This invention aims to develop a process for fractionation of lignocellulosic biomass by contacting lignocellulosic biomass with treatment liquid in close system at temperature not over 200° C. and pressure of 5 to 20 bars, wherein said treatment liquid comprises of water-miscible part, comprising formic acid, alcohol, and water and water-immiscible part that comprising alkyl acetate. The lignocellulosic biomass may be selected from rice straw, bagasse, corncobs, corn stem, palm waste, grass, pineapple shell, bamboo, or mixture thereof.

DETAILED DESCRIPTION OF THE INVENTION

Definitions

Figure 1:
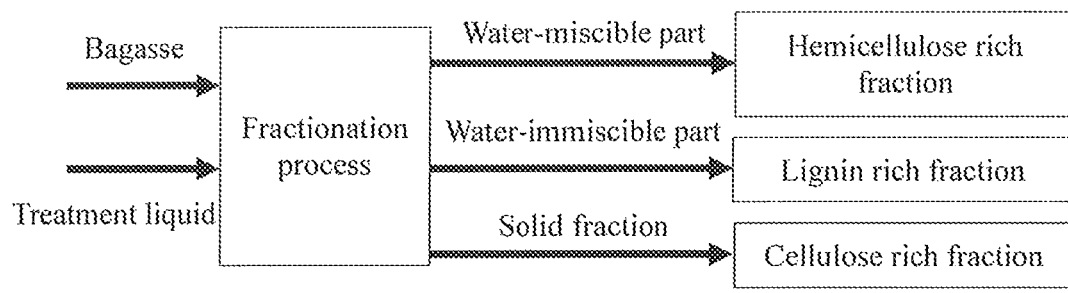
FIG. 1 shows steps of the fractionation of lignocellulosic biomass according to this invention.

Technical terms or scientific terms used herein, unless stated otherwise, have their definitions as known in persons skilled in the art.

Any tools, equipment, methods, or chemicals named here mean tools, equipment, methods, or chemicals being used commonly by person skilled in the art unless stated otherwise that they are tools, equipment, methods, or chemicals specific only in this invention.

Use of singular noun or singular pronoun with "comprising" in claims or specification means "one" and including "one or more" "at least one", and "one or more than one" too.

One objective of this invention is to develop the fractionation of lignocellulosic biomass by contacting the lignocellulosic biomass with the treatment liquid in close system at temperature not over 200° C. and pressure of 5 to 20 bars, wherein the treatment liquid comprises the water-miscible part, comprising formic acid, alcohol, and water; and the water-immiscible part, comprising alkyl acetate.

Hereafter, invention embodiments are shown without any purpose to limit any scope of the invention.

This invention involves the fractionation of lignocellulosic biomass by contacting lignocellulosic biomass with treatment liquid in close system at temperature not over 200° C. and pressure of 5 to 20 bars, wherein said treatment liquid comprising:

a. water-miscible part, comprising formic acid, alcohol, and water; and b. water-immiscible part, comprising alkyl acetate.

Preferably, the weight based ratio of the water-miscible part to the water-immiscible part of the treatment liquid is from 7.0:3.0 to 9.5:0.5 by weight, and more preferably is from 7.5:2.5 to 9.2:0.8.

In one embodiment, the proportion of formic acid is from 10 to 35% weight by weight of water-miscible treatment liquid, preferably is from 15 to 25% weight by weight of water-miscible treatment liquid.

In one embodiment, the proportion of alcohol is from 20 to 40% weight by weight of water-miscible treatment liquid.

Preferably, alcohol is selected from ethanol, methanol, or mixture thereof.

In one embodiment, the proportion of water is from 35 to 65% weight by weight of water-miscible treatment liquid.

In one embodiment, alkyl acetate is selected from ethyl acetate, propyl acetate, butyl acetate, iso-butyl acetate, amyl acetate, iso-amyl acetate, hexyl acetate, 2-ethylhexyl acetate, or mixture thereof, preferably is ethyl acetate.

In one embodiment, the temperature of said process is from 140 to 180° C., preferably is from 155 to 170° C.

In one embodiment, the contacting time of the lignocellulosic biomass to the treatment liquid is not over 90 minutes, preferably is from 25 to 60 minutes.

In one embodiment, the percentage of lignocellulosic biomass is from 5 to 5% dry weight by volume of the treatment liquid.

In one embodiment, the particle size of the lignocellulosic biomass is less than 425 μm.

In one embodiment, the process for fractionation of lignocellulosic biomass may further comprise stirring at 50 to 250 rpm.

In one embodiment, the process for fractionation of lignocellulosic biomass may further comprise digesting solid cellulose by cellulose or hemicellulase enzyme into sugar.

In one embodiment, the process for fractionation of lignocellulosic biomass may further comprise of washing solid with water until pH of washing water is in the range of 4 to 6.

In one embodiment, the lignocellulosic biomass may be selected from rice straw, bagasse, corncobs, corn stem, palm waste, grass, pineapple shell, bamboo, or mixture thereof.

The following is the preparing example of the lignocellulosic biomass and the fractionation of lignocellulosic biomass according to the invention and the analysis of sugar yield from the fractionation of biomass, wherein unless stated otherwise, method and equipment are method and equipment being used conventionally and not intended to limit the scope of the invention.

a) The preparation of biomass was performed by sizing of bagasse using sorting sieve at 300-425 μm (40-50 mesh).

b) The fractionation of biomass using treatment liquid was performed in 600 mL high pressure stainless reactor equipped with internal thermometer. One hundred milliliters of treatment liquid was added into 10 g of biomass wherein treatment liquid comprising water, ethanol, ethyl acetate, and formic acid. Then nitrogen gas was charged into the system until starting pressure was 5-20 bars. Then, system temperature was raised to about 140-180° C. for about 30-60 min. Time was counted after system reached the target temperature. Stirring might be provided at 100 rpm. After that, the reaction was stopped by reducing temperature such as water cooling. Solid and liquid was separated. Solid was washed with water until the pH of washing water was about 4-6 and being dried and digested with enzyme.

The quantitative analysis of sugar obtained from fractionated biomass was performed by adding 15 FPU (Filter Paper Unit) per gram of cellulase enzyme (Celtic CTEC2, Novozymes AS, Denmark) to the solid obtained from fractionation in 50 mM sodium acetate buffer at pH 5.0 and incubated at the temperature of 50° C. for 72 hours. Test tube was rotated at 30 rpm. Liquid fraction was taken for the determination of reducing sugar using dinitrosalicylic at method.

Note: FPU unit of cellulase enzyme in filter paper digestion was obtained from standard analytical method.

In one aspect of the invention, in order to obtain preferred product, liquid obtained from the fractionation according to the invention may be further fractionated by adding or adjusting mixture ratio of treatment liquid until there was phase separation between the water-miscible part and the water-immiscible part. Most of hemicellulose was soluble in the water-miscible part of treatment liquid. Lignin may be soluble in the water-immiscible part of treatment liquid and could be fractionated from liquid phase using precipitation method that could be done by reducing the proportion of the water-immiscible part of treatment liquid down such as evaporating the water-immiscible part, or increasing the proportion of the water-miscible part more. Hence, the water-miscible part of treatment liquid from fractionation of lignin was comprised mostly of hemicellulose which could be utilized in the production of alcohol, energy, or other important chemicals such as furanic compound, etc.

Qualitative and quantitative analysis of sugar obtained from enzymatic digestion and fractionation of biomass were performed by high performance liquid chromatography using HPLC, Water e2695 (Water, USA) equipped with differential refractometer detector and Aminex HPX-87H column (Bio-Rad, USA) according to standard method of NREL (The National Renewable Energy Laboratory) "Determination of Structural Carbohydrates and Lignin Biomass".

Hence, the quantity of biomass (cellulose, hemicellulose, and lignin) was reported in the amount of composition by dry weight when comparing to such composition in 100 g starting bagasse.

Enzymatic digestibility means the percentage amount of obtained glucose as mg sugar to g of treated material by dry weight, wherein the glucose recovery is calculated in percentage of glucose obtained from the enzymatic hydrolysis step comparing to the amount of cellulose in starting material by dry weight (×1.11) and pentose obtained from the calculation of percentage comparing to hemicellulose in starting material by dry weight (×1.13). The hemicellulose removal was calculated from residual hemicellulose from hemicellulose in solid fraction compared to said composition in starting material. The lignin removal was calculated from residual lignin from lignin in solid fraction compared to said composition in starting material.

Effect of Acids in the Fractionation of Biomass Using Treatment Liquid at 140-180° C.

Composition of starting untreated biomass was quantified. Bagasse is selected as an example of biomass. Said bagasse comprises about 42.39% cellulose, about 15.09% hemicellulose and about 30.84% lignin.

Bagasse was processed by the biomass fractionation according to the invention, comprising of contacting about 10 g of bagasse with about 100 mL of treatment liquid. The treatment liquid had the ratio of the water-miscible part to the water-immiscible part about 9 to 1. The water-miscible part contained about 22% by volume of acid, about 22% by volume of ethanol, and about 56% by volume of water. The water-immiscible part was ethyl acetate. Process temperature was increased to 140-180° C. for about 1 hour.

Formic acid was used as an example for the organic acid for this invention. Acetic acid was used as a comparative example. Both acids were used at about 22% by volume of the water-miscible part of treatment liquid. Sulfuric acid was used as the representative of inorganic acid at about 0.025 M, 0.2% by volume of the water-miscible part of treatment liquid.

Figure 2:
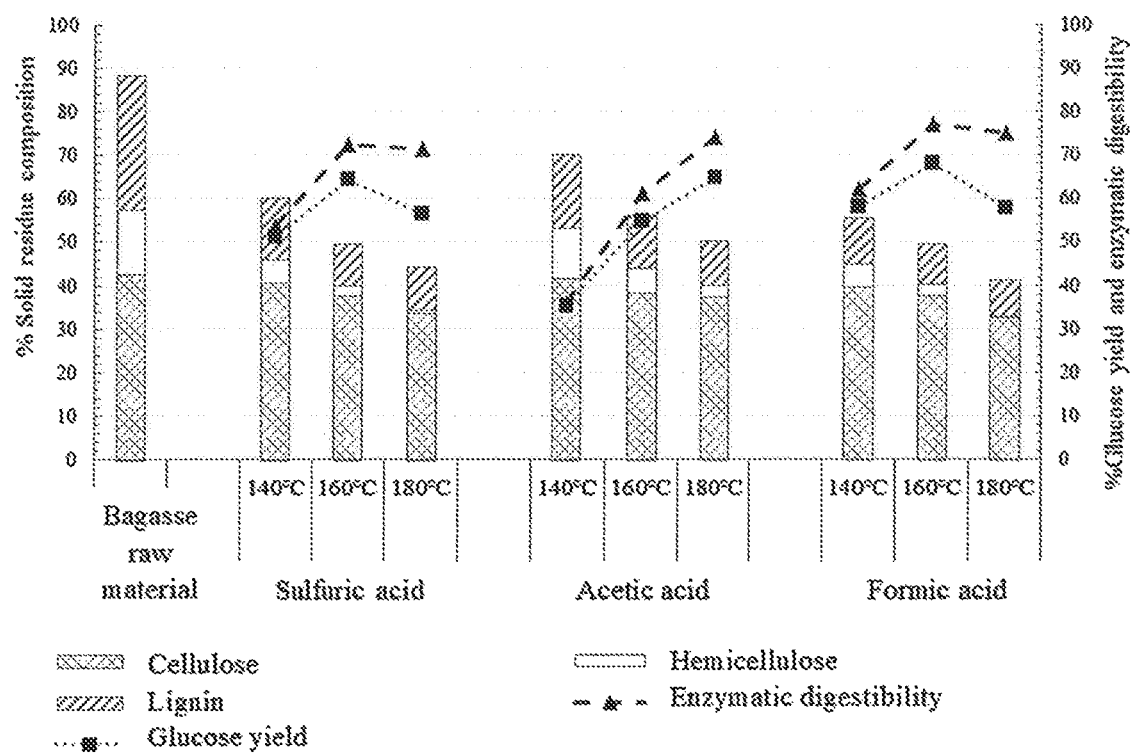
FIG. 2 shows effect of each acid on the quantity of cellulose, lignin, and hemicellulose in solid fraction, digestibility, and glucose recovery quantity in fractionation of biomass using treatment liquid at temperature of 140-180° C.

FIG. 2 shows that the use of formic acid gave about 8.2-10.77 g of lignin in solid fraction per 100 g of starting bagasse which is about 26.59-34.92% of lignin in solid fraction comparing to the amount of lignin in starting bagasse material as shown in table 1. The amount of lignin obtained by using formic acid in the process is lower than that of obtained using sulfuric acid or acetic acid. This shows that formic acid had high specificity for lignin removal, resulting in higher purity of cellulose u solid fraction. Moreover, an increase of process temperature resulted in an increase of enzymatic digestibility of biomass. In the case of using formic acid, it gave 62.01-77.05% enzymatic digestibility which was higher than that of using sulfuric acid or acetic acid. Using formic acid gave the highest amount of glucose of 68.06% comparing to cellulose in the starting material at 160° C., which was higher than that of obtained by using the other acids.

about 9 to 1. The water-miscible part comprised formic acid, ethanol, and water. The water-immiscible part was ethyl acetate. The mixture ratio of the water-miscible part of treatment liquid was varied as shown in table 2. Process temperature was controlled at about 180° C. for about 1 hour.

Figure 3:
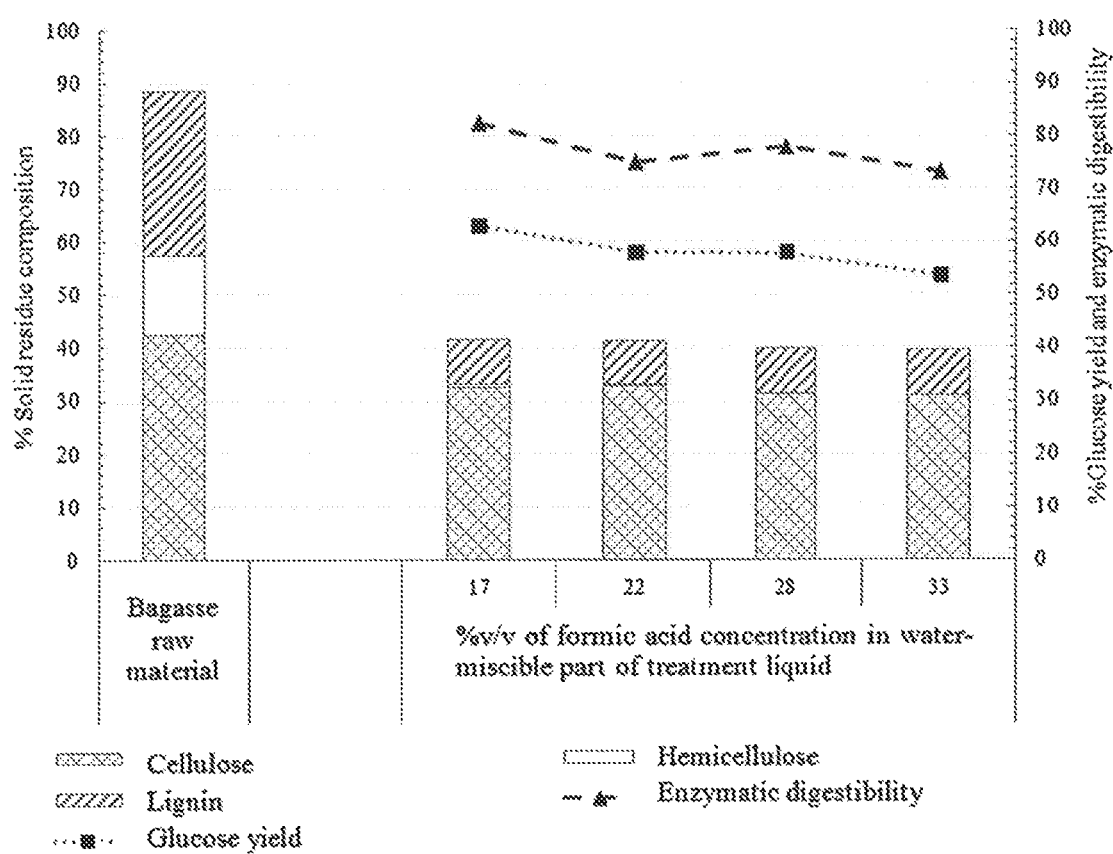
FIG. 3 shows ratio of mixture of the water compatible treatment liquid to the quantity of cellulose, lignin, and hemicellulose in solid fraction, the enzymatic digestibility of the solid and glucose recovery quantity from the fractionation of lignocellulosic biomass using treatment liquid.

Table 2 and FIG. 3 show the effect of the increase of formic acid amount at fixed temperature on the quantity of cellulose, hemicellulose, and lignin in solid fraction. As shown in FIG. 3, the use of different amount of formic acid gave about 30.98-32.43 g of cellulose in solid fraction per about 100 g of starting bagasse, which is about 73.26-77.30% of cellulose in starting material as shown in table 2. FIG. 3 shows the amount of lignin obtained from solid fraction at 8.56-8.63 g per about 100 g of starting bagasse. Hemicellulose was found very less or not being found in solid fraction. This shows that formic acid has high specificity to the fractionation of lignin and hemicellulose from the biomass, giving high purity of cellulose in solid fraction.

TABLE 2

Effect of mixture ratio of the water-miscible part of treatment liquid on the amount of cellulose, lignin, and hemicellulose in solid fraction, digestibility, and glucose recovery in the fractionation of biomass using treatment liquid

| Percentage by volume of formic acid: ethanol: water | Cellulose percentage in solid fraction* | Lignin percentage in solid fraction* | Hemi-cellulose percentage in solid fraction* | Solid enzymatic digestibility | Glucose recovery |
|---|---|---|---|---|---|
| 17:24:59 | 76.68 | 8.63 | 0.55 | 82.46 | 63.08 |
| 22:22:56 | 77.30 | 8.20 | 0.18 | 75.08 | 57.89 |
| 27:21:52 | 74.15 | 8.33 | 0.00 | 78.07 | 57.76 |
| 33:19:48 | 73.26 | 8.56 | 0.00 | 73.17 | 53.52 |

*Comparing to starting bagasse material

Effect of Time in the Fractionation of Biomass 10 grams of bagasse was contacted with about 100 mL of treatment liquid. The treatment liquid had the ratio of the

TABLE 1

Effect of the use of different acids on the amount of cellulose, lignin, and hemicellulose in solid fraction, digestibility, and glucose recovery in the fractionation of biomass using treatment liquid at 140-180° C.

| Type of acids | Process temperature (° C.) | Cellulose percentage in solid fraction* | Lignin percentage in solid fraction* | Hemicellulose percentage in solid fraction* | Solid enzymatic digestibility | Glucose recovery |
|---|---|---|---|---|---|---|
| Sulfuric acid | 140 | 95.19 | 46.14 | 35.52 | 53.79 | 51.21 |
| | 160 | 88.79 | 31.68 | 13.78 | 72.40 | 64.30 |
| | 180 | 78.93 | 31.42 | 5.63 | 71.35 | 56.32 |
| Acetic acid | 140 | 97.52 | 54.73 | 77.07 | 36.02 | 35.13 |
| | 160 | 89.79 | 39.43 | 38.17 | 61.01 | 54.79 |
| | 180 | 87.54 | 33.79 | 17.23 | 74.00 | 64.78 |
| Formic acid | 140 | 93.49 | 34.92 | 33.93 | 62.01 | 57.98 |
| | 160 | 88.32 | 29.93 | 19.02 | 77.05 | 68.06 |
| | 180 | 77.12 | 26.59 | 1.19 | 75.08 | 57.89 |

*Comparing to starting bagasse material

Effect of Mixing Ratio of Treatment Liquid in the Fractionation of Biomass 10 grams of bagasse was contacted with about 100 mL of treatment liquid. The treatment liquid had mixture ratio of the water-miscible part and the water-immiscible part at water-miscible part to the water-immiscible part about 9 to 1. The water-miscible part contained about 22% by volume of formic acid, about 22% by volume of ethanol, and about 56% by volume of water. The water-immiscible part was ethyl acetate. Process was operated at the temperature about 160° C. for about 30, 40, 50, and 60 min.

Figure 4:
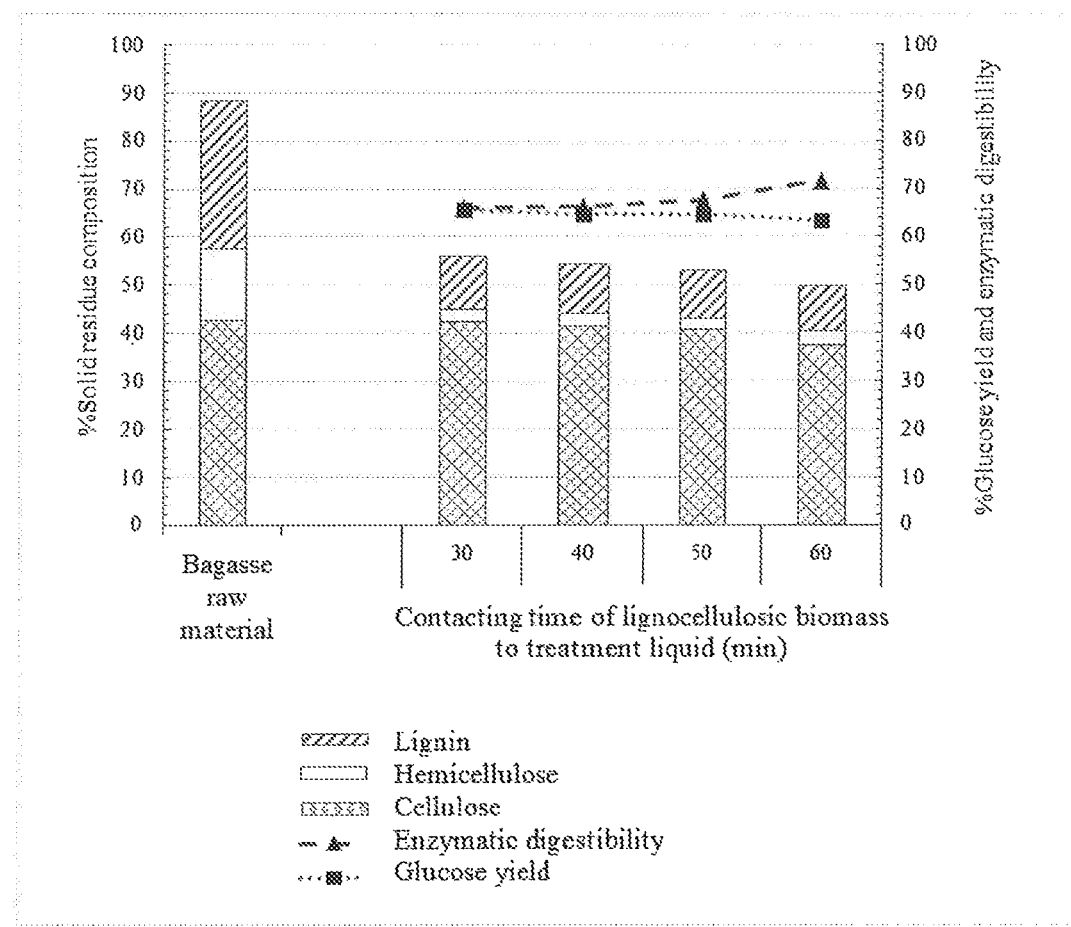
FIG. 4 shows effect of time to the quantity of cellulose, lignin, and hemicellulose in solid fraction, the enzymatic solid digestibility, and glucose recovery quantity from the fractionation of lignocellulosic biomass using treatment liquid.

Table 3 and FIG. 4 show that the increase of time at a certain temperature resulted in slightly reduction of the total weight in solid fraction, cellulose, and lignin in solid fraction. However, when considering effectiveness and reaction specificity of biomass fractionation, it was found that an increase of time gave higher purity of obtained solid fraction as seen in the reduction of the cellulose and lignin amount. An increase of time resulted in an increase of enzymatic digestibility from 65.88 to 71.78%.

TABLE 3

Effect of time on the amount of cellulose, lignin, and hemicellulose in solid fraction, digestibility, and glucose recovery in the fractionation of biomass using treatment liquid

| Time (min) | Cellulose percentage in solid fraction* | Lignin percentage in solid fraction* | Hemicellulose percentage in solid fraction* | Solid enzymatic digestibility | Glucose recovery |
|---|---|---|---|---|---|
| 30 | 99.69 | 11.07 | 7.69 | 65.88 | 65.53 |
| 40 | 97.59 | 10.14 | 2.66 | 66.30 | 64.56 |
| 50 | 96.07 | 10.00 | 2.08 | 67.57 | 64.77 |
| 60 | 88.53 | 9.23 | 2.87 | 71.78 | 63.4 |

*Comparing to starting bagasse material

Effect of Alcohol Ratio in Treatment Liquid in the Fractionation of Biomass

Figure 5:
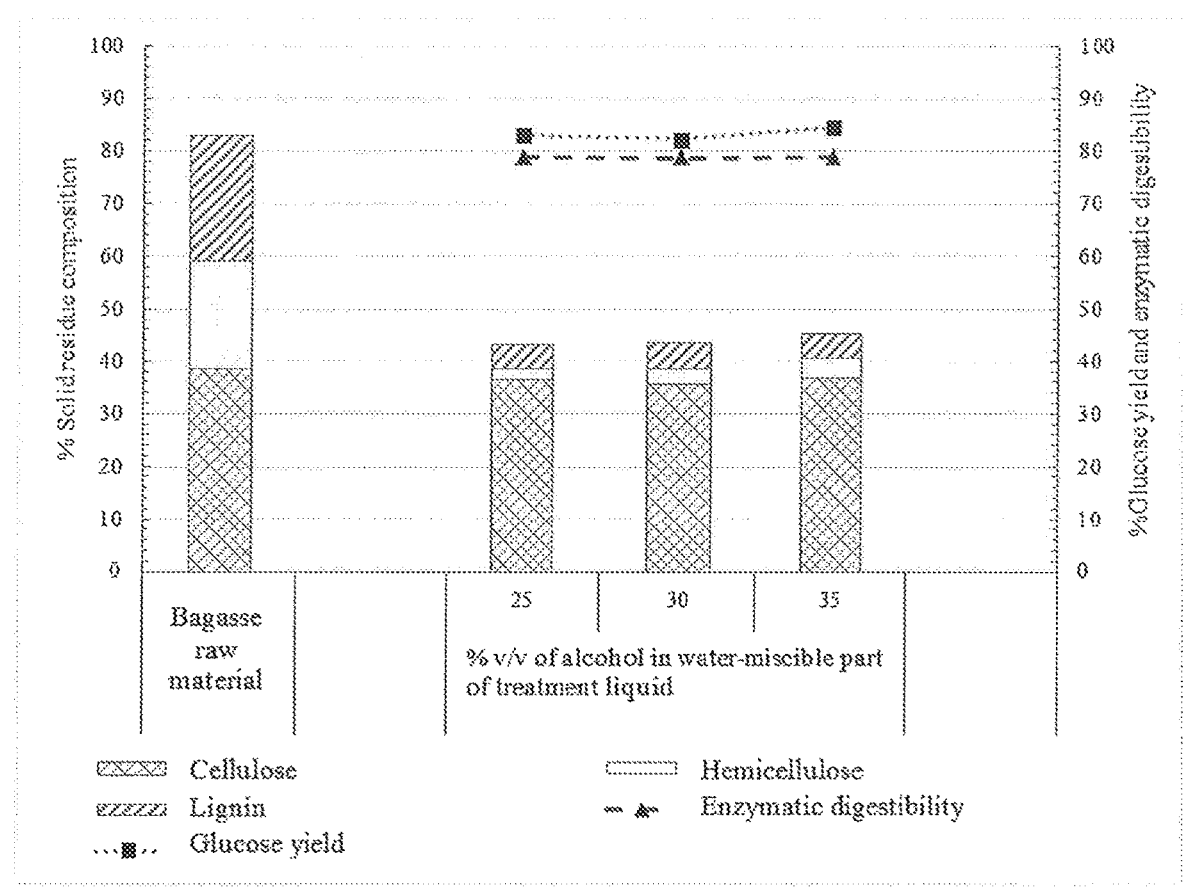
FIG. 5 shows effect of ethanol proportion in treatment liquid to the quantity of cellulose, lignin, and hemicellulose in solid fraction, the enzymatic digestibility of the solid, and glucose recovery quantity from the fractionation of lignocellulosic biomass using treatment liquid.

Bagasse sample in the study of effect of alcohol ratio in treatment liquid had the following composition: about 38.32% of cellulose, about 20.65% of hemicellulose, and about 23.71% lignin, as shown in FIG. 5.

10 grams of bagasse was contacted with about 100 mL of treatment liquid. The treatment liquid had mixture ratio of the water-miscible part and the water-immiscible part at about 8 to 2. The water-miscible part comprised formic acid, ethanol, and water. The quantity of formic acid was about 23% by volume of the volume of the water-miscible part. The alcohol ratio in the water-miscible part of treatment liquid was shown in table 4. The water-immiscible part was ethyl acetate. Process temperature was controlled at about 160° C. for about 40 min. Results are shown in table 4 and FIG. 5.

TABLE 4

Effect of ethanol ratio in treatment liquid on the amount of cellulose, lignin, and hemicellulose in solid fraction, digestibility, and glucose recovery in the fractionation of biomass using treatment liquid

| Percentage by volume of alcohol in the water-miscible part of treatment liquid | Cellulose percentage in solid fraction* | Lignin percentage in solid fraction* | Hemicellulose percentage in solid fraction* | Solid enzymatic digestibility | Glucose recovery |
|---|---|---|---|---|---|
| 25 | 94.62 | 5.91 | 1.57 | 78.70 | 82.92 |
| 30 | 92.12 | 6.29 | 2.25 | 78.55 | 82.18 |
| 35 | 95.80 | 6.15 | 2.66 | 78.72 | 84.22 |

*Comparing to starting bagasse material

The following is the experimental design and data analysis using statistical process to understand the relationship of variables that affect the efficiency of the biomass fractionation according to the invention and to get the optimal condition for said biomass fractionation.

The experimental design was performed using response surface methodology (RSM) using STATISTIC 8.0 (Statsoft, USA). Then, the experiment was performed according to the conditions from said experimental design and the data was analyzed using the analysis of variance (ANOVA) to study correlation between the variables which were temperature, time, the amount of ethyl acetate, and the amount of formic acid in the treatment liquid to the efficiency of the fractionation of biomass which were pulp yield, enzymatic digestibility, glucose recovery, lignin removal, and hemicellulose removal.

Range of variables for the experimental design was shown in table 5. The amount of the starting biomass was fixed to 10% by weight to the volume of treatment liquid.

TABLE 5

Range of variables in order to get the optimal condition for the fractionation of biomass

| | Coded factors | | | | | |
|---|---|---|---|---|---|---|
| | | | | Solvent percentage by volume | | |
| | | | Formic | | | |
| Coded level | Temperature (° C.) | Time (min) | acid percentage | ethyl acetate | ethanol | water |
| α (−2) | 140 | 20 | 10 | 15 | 25 | 60 |
| −1 | 150 | 30 | 15 | 20 | 25 | 55 |
| 0 | 160 | 40 | 20 | 25 | 25 | 50 |
| 1 | 170 | 50 | 25 | 30 | 25 | 45 |
| α (+2) | 180 | 60 | 30 | 35 | 25 | 40 |

The experimental design was done using response surface area method using variables in table 5. Twenty-five experimental sets were obtained as shown in table 6. Then, experiment was performed according to said conditions.

From results shown in table 6, it was found that the solid fraction weight from the biomass fractionation was obtained in the range of 42.19-54.75% whereas the enzymatic digestibility were in the range of 56.09-77.36% with the maximum at condition no. 22. Glucose recovery was in the range of 70.74-85.01% with the maximum at condition no. 24. Lignin removal was in the range of 64.03-85.35% with the maximum at condition no. 17, whereas hemicellulose removal was in the range of 71.04-95.19% with the maximum at condition no. 19.

TABLE 6

Effect of variables to the effectiveness of the fractionation of biomass

| | Experimental condition | | | | Weight percentage of solid fraction obtained from the process | Enzymatic digestibility | Glucose recovery | Lignin removal percentage | Hemicellulose removal percentage |
|---|---|---|---|---|---|---|---|---|---|
| | Temperature (° C.) | Time (min) | Formic acid percentage by volume | Ethyl acetate percentage by volume | | | | | |
| 1 | 150 | 50 | 15 | 20 | 49.97 | 71.74 | 84.2 | 70.29 | 88.61 |
| 2 | 150 | 30 | 15 | 30 | 54.75 | 57.32 | 73.7 | 73.5 | 71.04 |
| 3 | 150 | 30 | 25 | 20 | 50.17 | 68.34 | 80.51 | 73.84 | 80.63 |
| 4 | 150 | 50 | 25 | 30 | 48.61 | 67.36 | 76.88 | 75.96 | 82.44 |
| 5 | 170 | 30 | 15 | 20 | 46.43 | 72.80 | 79.38 | 78.01 | 89.7 |
| 6 | 170 | 50 | 15 | 30 | 44.84 | 75.59 | 79.59 | 78.71 | 91.02 |
| 7 | 170 | 50 | 25 | 20 | 43.15 | 69.80 | 70.74 | 81.14 | 94.76 |
| 8 | 170 | 30 | 25 | 30 | 45.45 | 71.03 | 75.81 | 79.19 | 89.61 |
| 9 | 160 | 40 | 20 | 25 | 46.16 | 77.14 | 83.62 | 81.44 | 89.39 |
| 10 | 150 | 30 | 15 | 20 | 51.24 | 66.10 | 79.54 | 67.77 | 80.91 |
| 11 | 150 | 50 | 15 | 30 | 50.48 | 60.21 | 71.38 | 75.8 | 80.28 |
| 12 | 150 | 50 | 25 | 20 | 47.48 | 67.04 | 74.74 | 79.39 | 84.81 |
| 13 | 150 | 30 | 25 | 30 | 49.18 | 64.74 | 74.78 | 78.52 | 78.68 |
| 14 | 170 | 50 | 15 | 20 | 43.69 | 74.10 | 76.02 | 76.75 | 92.63 |
| 15 | 170 | 30 | 15 | 30 | 45.17 | 73.79 | 77.62 | 84.19 | 87.66 |
| 16 | 170 | 30 | 25 | 20 | 43.34 | 76.67 | 78.04 | 80.09 | 94.52 |
| 17 | 170 | 50 | 25 | 30 | 42.85 | 71.57 | 72.01 | 85.35 | 94.71 |
| 18 | 140 | 40 | 20 | 25 | 54.21 | 56.09 | 71.4 | 64.03 | 74.38 |
| 19 | 180 | 40 | 20 | 25 | 42.19 | 71.58 | 70.92 | 75.85 | 95.19 |
| 20 | 160 | 40 | 10 | 25 | 46.67 | 69.19 | 75.83 | 80.53 | 85.45 |
| 21 | 160 | 40 | 30 | 25 | 43.90 | 72.77 | 75.03 | 82.11 | 92.57 |
| 22 | 160 | 40 | 20 | 15 | 45.69 | 77.36 | 83.01 | 80.17 | 91.47 |
| 23 | 160 | 40 | 20 | 35 | 48.51 | 71.55 | 81.53 | 82.13 | 84.01 |
| 24 | 160 | 20 | 20 | 25 | 48.66 | 73.21 | 85.01 | 76.95 | 82.64 |
| 25 | 160 | 60 | 20 | 25 | 45.77 | 71.11 | 76.43 | 84.7 | 88.36 |

Data from table 6 was analyzed using the analysis of variance (ANOVA) to obtain significant variable to the efficiency of the biomass fractionation and analyzed using response surface methodology to obtain the best condition for the biomass fractionation.

Effect of Variables to Pulp Yield Obtained from the Fractionation of Biomass

The analysis of variance (ANOVA) shows that all variables such as temperature, time, the amount of formic acid, and the amount of ethyl acetate significantly affected the pulp yield obtained from the biomass fractionation which can be seen from P value that was lower than 0.05 ($P<0.05$) as shown in table 7.

Figure 6:
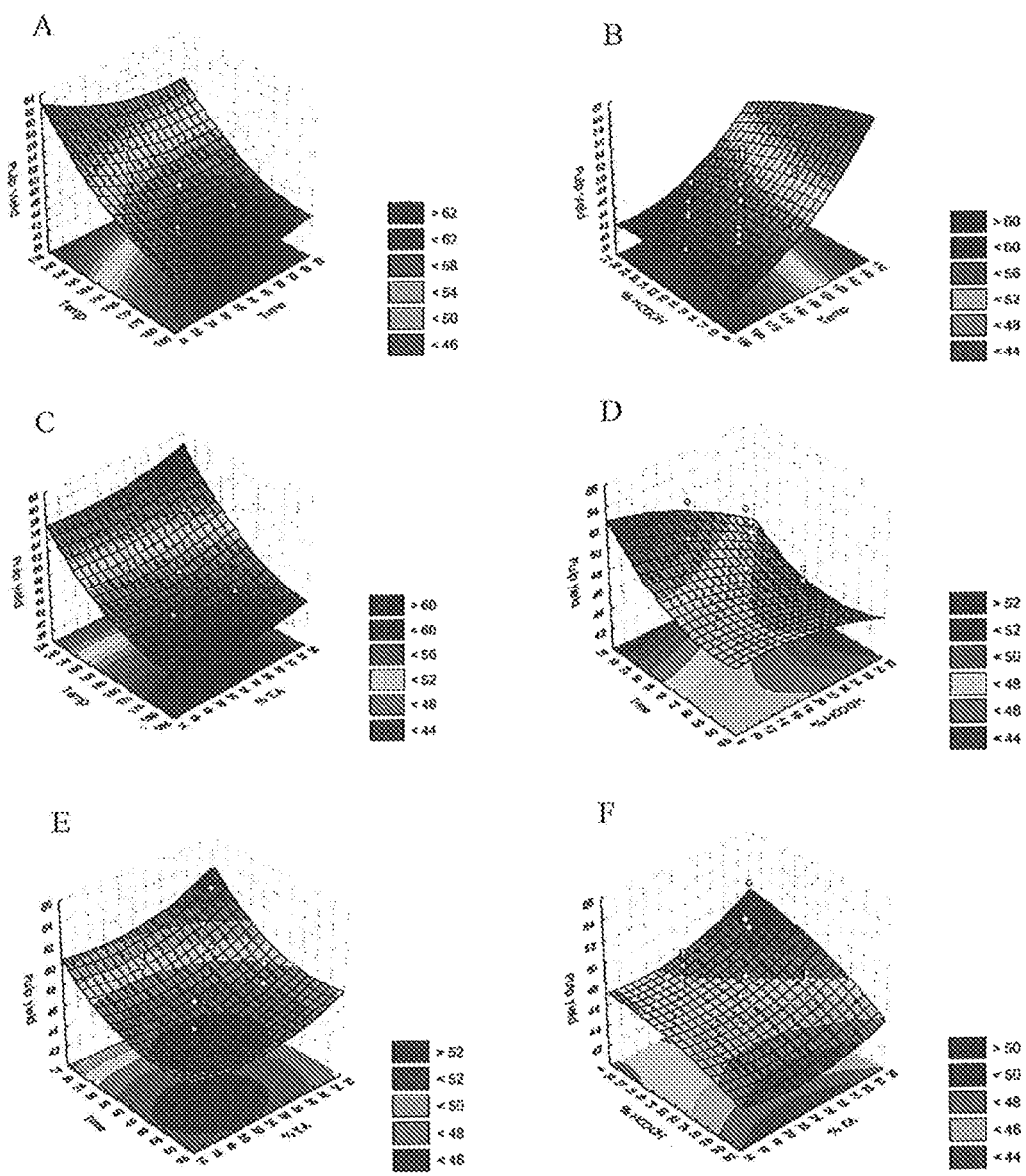
FIG. 6 shows response surface area that represents effect of variables to obtained pulp yield from the fractionation of biomass (Temp is temperature; Time is time; HCOOH is formic acid; and EA is ethyl acetate):
  (a) effect of temperature and time when the quantity of formic acid and ethyl acetate are fixed at center point;
  (b) effect of temperature and formic acid when time and the quantity of ethyl acetate are fixed at the center point;
  (c) effect of temperature and the quantity of ethyl acetate when time and the quantity of formic acid are fixed at the center point;
  (d) effect of time and the quantity of formic acid when the temperature and the quantity of ethyl acetate are fixed at the center point;
  (e) effect of time and the quantity of ethyl acetate when the temperature and the quantity of formic acid are fixed at the center point;
  (f) effect of quantity of the quantity of formic acid and ethyl acetate when the temperature and time are fixed at the center point.

From said analysis data, the correlation of variables to pulp yield in response surface can be shown in FIG. 6 and correlation equation of variables to pulp yield can be acquired as following:

$$\text{Pulp yield} = 46.16285 - 5.91476A + 1.12629A^2 - 1.73736B + 0.68447B^2 - 1.82346C - 0.32914C^2 + 0.95797D + 0.57613D^2 + 0.36722AB + 0.70759AC - 0.30773AD + 0.31968BC - 0.11096BD - 0.24507CD;$$

When A represents temperature, B represents time, C represents the amount of formic acid, and D represents the amount of ethyl acetate.

TABLE 7

Effect of variables to obtained pulp yield by the analysis of variance

| Source of Variances | Sum of Squares | Degree of Freedom | Means Square | F Statistic | P Value |
|---|---|---|---|---|---|
| temperature | 209.9063 | 1 | 209.9063 | 201.2731 | 0.0000 |
| temperature*temperature | 3.5817 | 1 | 3.5817 | 3.4344 | 0.0935 |
| time | 18.1105 | 1 | 18.1105 | 17.3657 | 0.0019 |
| time*time | 1.3228 | 1 | 1.3228 | 1.2684 | 0.2864 |
| the amount of formic acid | 19.9500 | 1 | 19.9500 | 19.1295 | 0.0014 |
| the amount of formic acid* the amount of formic acid | 0.3059 | 1 | 0.3059 | 0.2933 | 0.6000 |
| the amount of ethyl acetate | 5.5063 | 1 | 5.5063 | 5.2798 | 0.0444 |
| the amount of ethyl acetate* the amount of ethyl acetate | 0.9372 | 1 | 0.9372 | 0.8987 | 0.3655 |
| temperature*time | 0.5394 | 1 | 0.5394 | 0.5172 | 0.4885 |
| temperature*the amount of formic acid | 2.0027 | 1 | 2.0027 | 1.9204 | 0.1959 |
| temperature*the amount of ethyl acetate | 0.3788 | 1 | 0.3788 | 0.3632 | 0.5601 |
| time*the amount of formic acid | 0.4088 | 1 | 0.4088 | 0.3920 | 0.5453 |
| time*the amount of ethyl acetate | 0.0493 | 1 | 0.0493 | 0.0472 | 0.8323 |

Effect of Variables to Enzymatic Digestibility

The analysis of variance (ANOVA) shows that temperature, temperature power two, time, the amount of formic acid power two, and the amount of ethyl acetate significantly affected the enzymatic digestibility which can be seen from P value that was lower than 0.05 (P<0.05) as shown in table 8.

Figure 7:
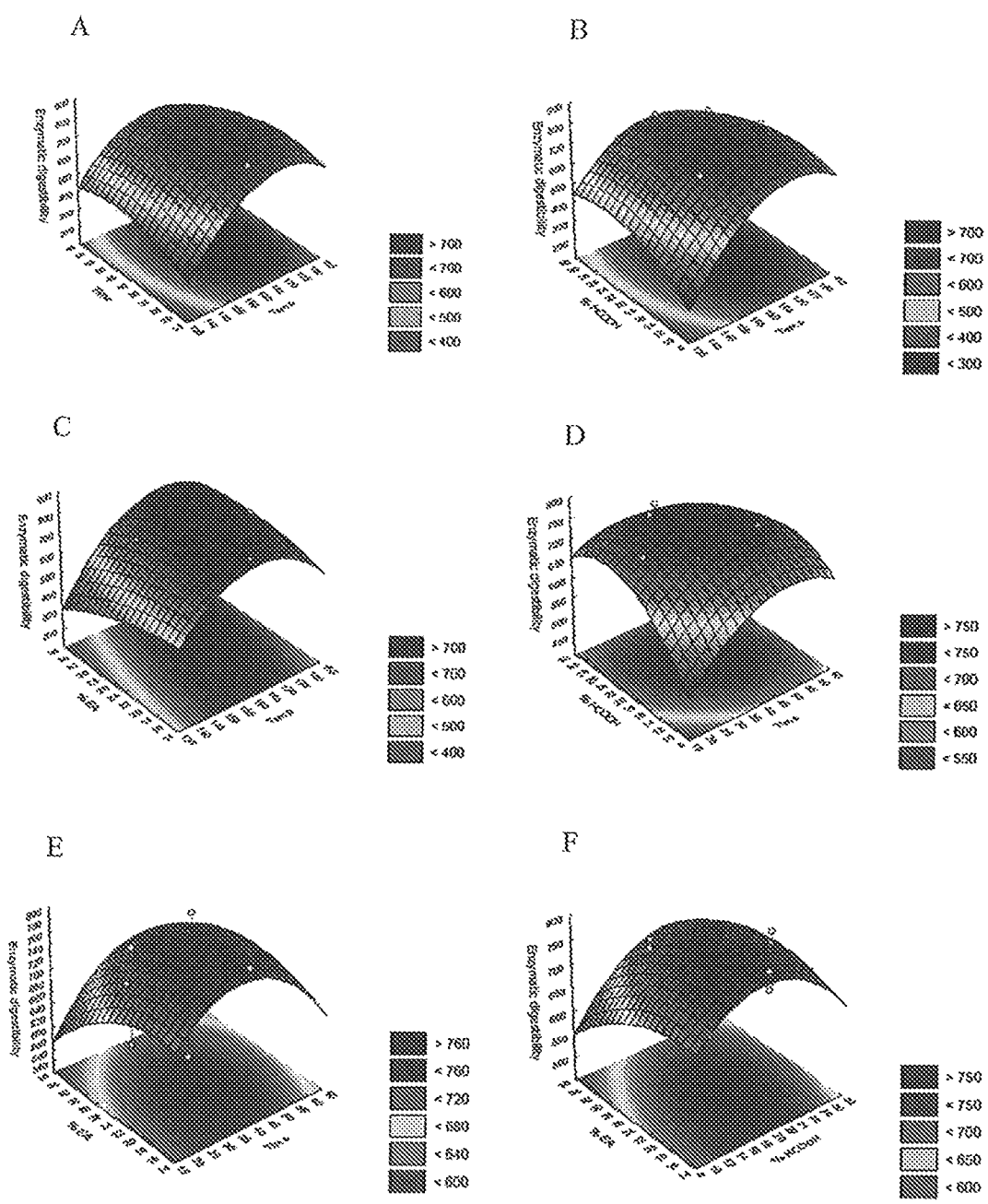
FIG. 7 shows response surface area that represents effect of variables to the solid enzymatic digestibility (Temp is temperature; Time is time; HCOOH is formic acid; and EA is ethyl acetate):
  (a) effect of temperature and time when the quantity of formic acid and ethyl acetate are fixed at center point;
  (b) effect of temperature and formic acid when time and the quantity of ethyl acetate are fixed at the center point;
  (c) effect of temperature and the quantity of ethyl acetate when time and the quantity of formic acid are fixed at the center point;
  (d) effect of time and the quantity of formic acid when the temperature and the quantity of ethyl acetate are fixed at the center point;
  (e) effect of time and the quantity of ethyl acetate when the temperature and the quantity of formic acid are fixed at the center point;
  (f) effect of quantity of the quantity of formic acid and ethyl acetate when the temperature and time are fixed at the center point.

From said analysis data, the correlation or variables to enzymatic digestibility in response surface can be shown in FIG. 7 and correlation equation of variables to enzymatic digestibility can be acquired as following:

$$\text{Enzymatic digestibility} = 771.37040 + 77.89330A - 70.17410A^2 + 2.00700B - 28.53370B^2 + 10.03920C - 34.43090C^2 - 30.50870D - 17.06030D^2 - 16.34580AB - 24.11710AC + 27.72490AD - 20.80220BC + 11.33870BD + 13.32820CD;$$

When A represents temperature, B represents time, C represents the amount of formic acid, and D represents the amount of ethyl acetate.

From FIG. 7 and above equation, the maximum enzymatic digestibility can be predicted as 78.48 at 164.7° C., 38.1 min, 19.6% formic acid, and 22.0% ethyl acetate, which was close to value obtained from experiment at said condition which was 79.05.

TABLE 8

Effect of variables to enzymatic digestibility by the analysis of variance

| Source of Variances | Sum of Squares | Degree of Freedom | Means Square | F Statistic | P Value |
|---|---|---|---|---|---|
| temperature | 36404.24 | 1 | 36404.24 | 58.7634 | 0.0000 |
| temperature*temperature | 13904.20 | 1 | 13904.20 | 22.4441 | 0.0008 |
| time | 24.17 | 1 | 24.17 | 0.0390 | 0.8474 |
| time*time | 2298.84 | 1 | 2298.84 | 3.7108 | 0.0829 |
| the amount of formic acid | 604.72 | 1 | 604.72 | 0.9761 | 0.3465 |
| the amount of formic acid*the amount of formic acid | 3347.26 | 1 | 3347.26 | 5.4031 | 0.0424 |
| the amount of ethyl acetate | 5584.68 | 1 | 5584.68 | 9.0148 | 0.0131 |
| the amount of ethyl acetate*the amount of ethyl acetate | 821.80 | 1 | 821.80 | 1.3266 | 0.2762 |
| temperature*time | 1068.74 | 1 | 1068.74 | 1.7252 | 0.2184 |
| temperature*the amount of formic acid | 2326.53 | 1 | 2326.53 | 3.7555 | 0.0814 |
| temperature*the amount of ethyl acetate | 3074.68 | 1 | 3074.68 | 4.9631 | 0.0500 |
| time*the amount of formic acid | 1730.93 | 1 | 1730.93 | 2.7941 | 0.1256 |
| time*the amount of ethyl acetate | 514.26 | 1 | 514.26 | 0.8301 | 0.3837 |
| the amount of formic acid*the amount of ethyl acetate | 710.57 | 1 | 710.57 | 1.1470 | 0.3093 |
| Residual | 6195.05 | 10 | 619.50 | | |
| total | 76254.35 | 24 | | | |

Effect of Variables on Glucose Recovery

The analysis of variance (ANOVA) shows that temperature, temperature power two, and the amount of formic acid power two significantly affected the glucose recovery which can be seen from P value that was lower than 0.05 (P<0.05) as shown in table 9.

Figure 8:
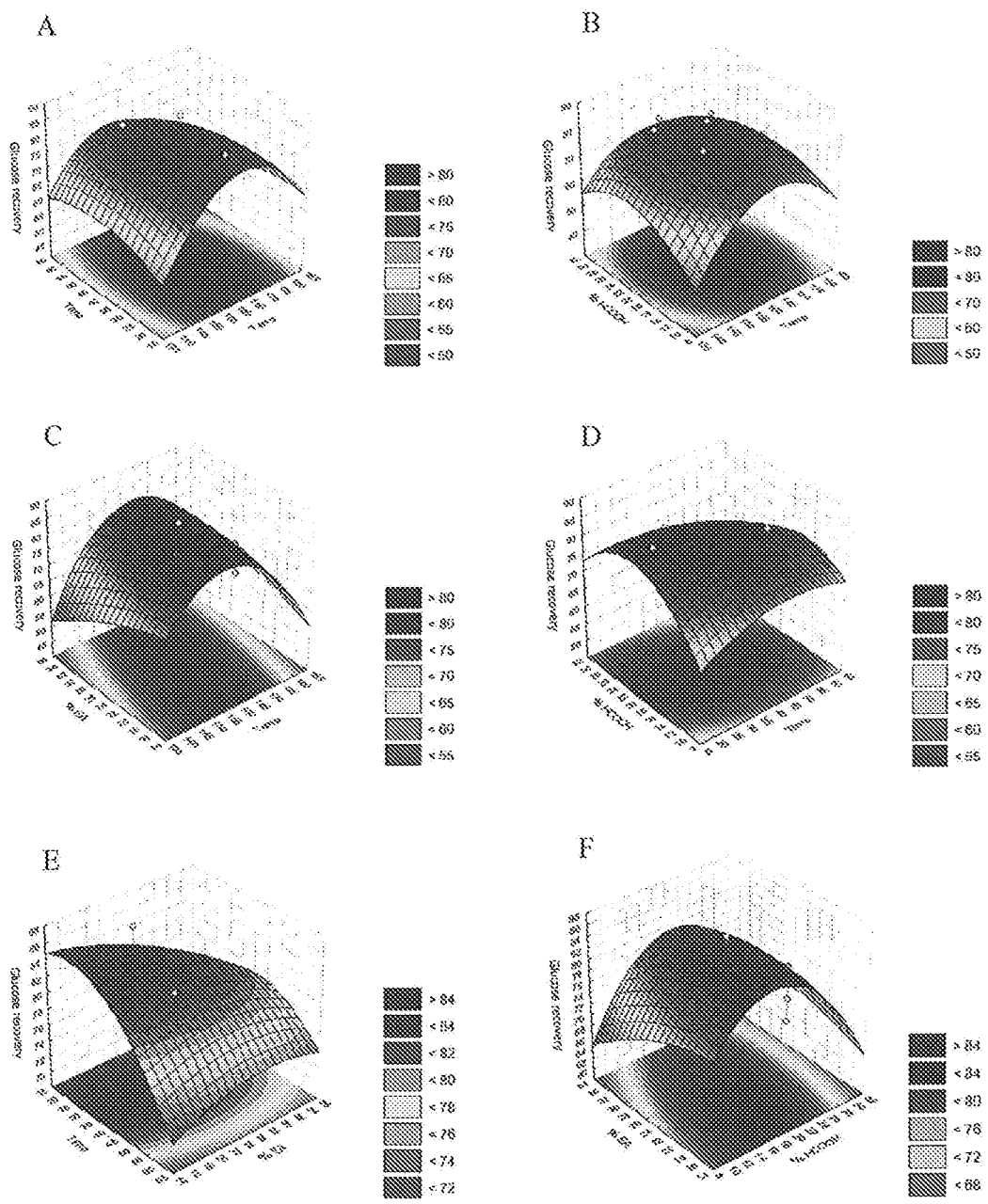
FIG. 8 shows response surface area that represents effect of variables to the glucose recovery quantity comparing to cellulose in starting raw materials (Temp is temperature; Time is time; HCOOH is formic acid; and EA is ethyl acetate):
  (a) effect of temperature and time when the quantity of formic acid and ethyl acetate are fixed at center point;
  (b) effect of temperature and formic acid when time and the quantity of ethyl acetate are fixed at the center point;
  (c) effect of temperature and the quantity of ethyl acetate when time and the quantity of formic acid are fixed at the center point;
  (d) effect of time and the quantity of formic acid when the temperature and the quantity of ethyl acetate are fixed at the center point;
  (e) effect of time and the quantity of ethyl acetate when the temperature and the quantity of formic acid are fixed at the center point;
  (f) effect of quantity of the quantity of formic acid and ethyl acetate when the temperature and time are fixed at the center point.

From said analysis data, the correlation of variables to glucose recovery in response surface can be shown in FIG. 8 and correlation equation of variables to enzymatic digestibility can be acquired as following:

$$\text{Glucose recovery} = 83.62166 - 0.62253A - 6.51073A^2 - 2.58010B - 1.72853B^2 - 1.62834C - 4.37388C^2 - 2.02913D - 0.95523D^2 - 1.39497AB - 1.76428AC + 2.88942AD - 1.96341BC + 1.21576BD + 1.53686CD;$$

When A represents temperature, B represents time, C represents the amount of formic acid, D represents the amount of ethyl acetate.

From FIG. 8 and above equation, the maximum glucose recovery can be predicted as 86.25 at 154.8° C., 25.8 min, 18.6% formic acid, and 10.1% ethyl acetate, which was close to value obtained from experiment at said condition which was 87.21.

TABLE 7-continued

Effect of variables to obtained pulp yield by the analysis of variance

| Source of Variances | Sum of Squares | Degree of Freedom | Means Square | F Statistic | P Value |
|---|---|---|---|---|---|
| the amount of formic acid*the amount of ethyl acetate | 0.2402 | 1 | 0.2402 | 0.2304 | 0.6416 |
| Residual | 10.4289 | 10 | 1.0429 | | |
| total | 277.4872 | 24 | | | |

TABLE 9

Effect of variables on glucose recovery by the analysis of variance

| Source of Variances | Sum of Squares | Degree of Freedom | Means Square | F Statistic | P Value |
|---|---|---|---|---|---|
| temperature | 2.3253 | 1 | 2.3253 | 0.3098 | 0.5901 |
| temperature*temperature | 119.6882 | 1 | 119.6882 | 15.9447 | 0.0025 |
| time | 39.9413 | 1 | 39.9413 | 5.3209 | 0.0438 |
| time*time | 8.4362 | 1 | 8.4362 | 1.1239 | 0.3140 |
| the amount of formic acid | 15.9089 | 1 | 15.9089 | 2.1104 | 0.1761 |
| the amount of formic acid* the amount of formic acid | 54.0164 | 1 | 54.0164 | 7.1960 | 0.0230 |
| the amount of ethyl acetate | 24.7043 | 1 | 24.7043 | 3.2911 | 0.0997 |
| the amount of ethyl acetate* the amount of ethyl acetate | 2.5764 | 1 | 2.5764 | 0.3432 | 0.5710 |
| temperature*time | 7.7838 | 1 | 7.7838 | 1.0369 | 0.3325 |
| temperature*the amount of formic acid | 12.4507 | 1 | 12.4507 | 1.6587 | 0.2268 |
| temperature*the amount of ethyl acetate | 33.3950 | 1 | 33.3950 | 4.4489 | 0.0611 |
| time*the amount of formic acid | 15.4199 | 1 | 15.4199 | 2.0542 | 0.1823 |
| time*the amount of ethyl acetate | 5.9122 | 1 | 5.9122 | 0.7876 | 0.3957 |
| the amount of formic acid*the amount of ethyl acetate | 9.4478 | 1 | 9.4478 | 1.2586 | 0.2881 |
| Residual | 75.0644 | 10 | 75.0644 | | |
| total | 441.7019 | 24 | | | |

Effect of Variables on Lignin Removal

The analysis of variance (ANOVA) shows that temperature, temperature power two, and the amount of formic acid significantly affected the lignin removal which can be seen from P value that was lower than 0.05 ($P<0.05$) as shown in table 10.

Figure 9:
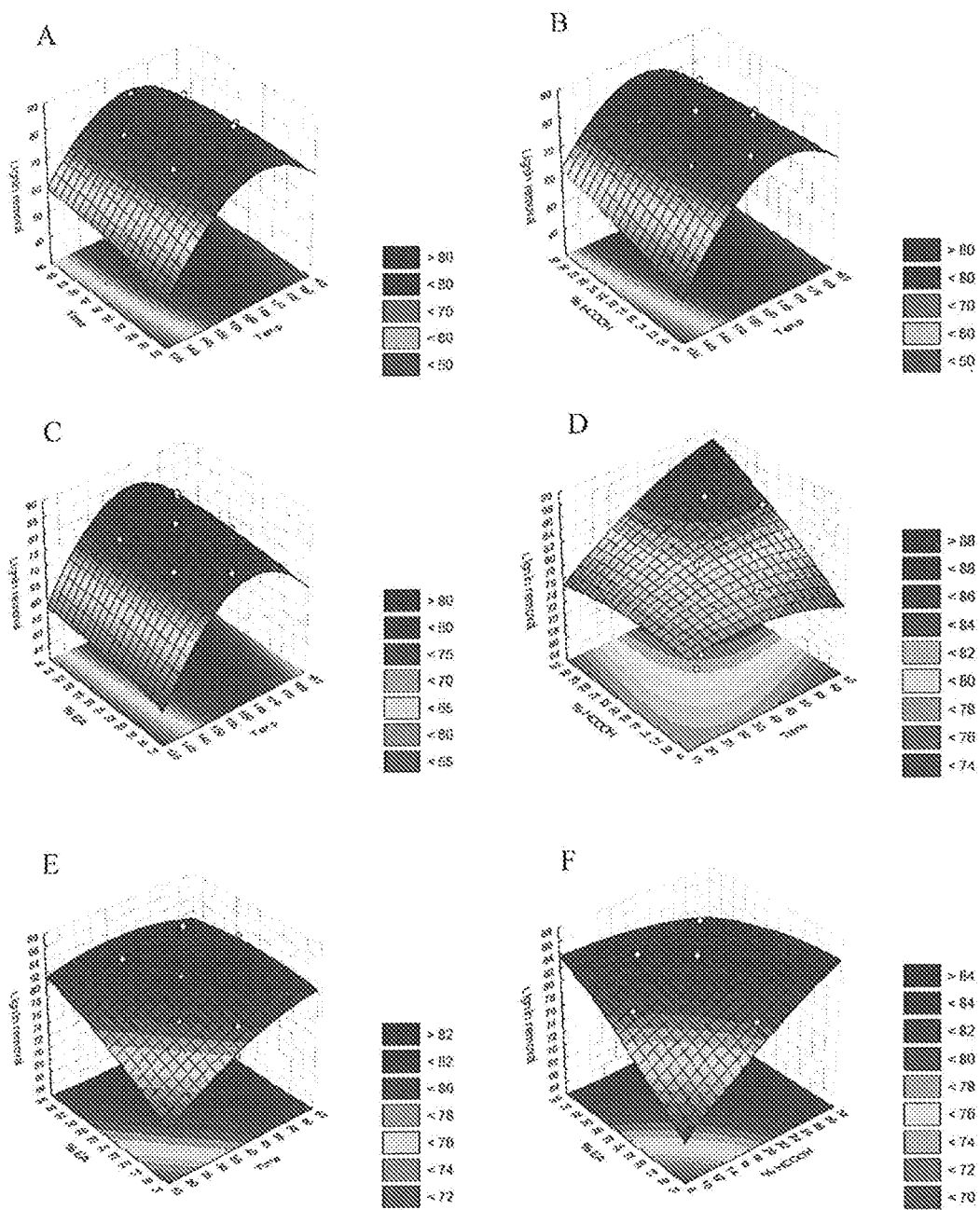
FIG. 9 shows response surface area that represents effect of variables to lignin removal percentage from solid fraction comparing to the lignin quantity in starting biomass (Temp is temperature; Time is time; HCOOH is formic acid; and EA is ethyl acetate):
  (a) effect of temperature and time when the quantity of formic acid and ethyl acetate are fixed at center point;
  (b) effect of temperature and formic acid when time and the quantity of ethyl acetate are fixed at the center point;
  (c) effect of temperature and the quantity of ethyl acetate when time and the quantity of formic acid are fixed at the center point;
  (d) effect of time and the quantity of formic acid when the temperature and the quantity of ethyl acetate are fixed at the center point;
  (e) effect of time and the quantity of ethyl acetate when the temperature and the quantity of formic acid are fixed at the center point;
  (f) effect of quantity of the quantity of formic acid and ethyl acetate when the temperature and time are fixed at the center point.

From said analysis data, the correlation of variables to lignin removal in response surface can be shown in FIG. 9 and correlation equation of variables to lignin removal can be acquired as following:

Lignin removal = $81.44070 + 6.04246A - 6.06154A^2 + 2.02353B - 0.61872B^2 + 2.67628C - 0.37040C^2 + 2.36608D - 0.45633D^2 - 0.97931AB - 1.59158AC - 0.19203AD + 1.45194BC - 0.99416BD - 1.91678CD;$ When A represents temperature, B represents time, C represents the amount of formic acid, and D represents the amount of ethyl acetate.

From FIG. 9 and above equation, the maximum lignin removal can be predicted as 83.20 at 164.0° C., 45.3 min, 21.3% formic acid, and 31.8% ethyl acetate, which was close to value obtained from experiment at said condition which was 85.28.

TABLE 10

Effect of variables on lignin removal by the analysis of variance

| Source of Variances | Sum of Squares | Degree of Freedom | Means Square | F Statistic | P Value |
|---|---|---|---|---|---|
| temperature | 219.0679 | 1 | 219.0679 | 29.7540 | 0.0003 |
| temperature*temperature | 103.7427 | 1 | 103.7427 | 14.0904 | 0.0038 |
| time | 24.5680 | 1 | 24.5680 | 3.3369 | 0.0977 |
| time*time | 1.0809 | 1 | 1.0809 | 0.1468 | 0.7096 |
| the amount of formic acid | 42.9749 | 1 | 42.9749 | 5.8369 | 0.0363 |
| the amount of formic acid* the amount of formic acid | 0.3874 | 1 | 0.3874 | 0.0526 | 0.8232 |
| the amount of ethyl acetate | 33.5899 | 1 | 33.5899 | 4.5622 | 0.0584 |
| the amount of ethyl acetate* the amount of ethyl acetate | 0.5880 | 1 | 0.5880 | 0.0799 | 0.7833 |
| temperature*time | 3.8362 | 1 | 3.8362 | 0.5210 | 0.4869 |
| temperature*the amount of formic acid | 10.1325 | 1 | 10.1325 | 1.3762 | 0.2679 |
| temperature*the amount of ethyl acetate | 0.1475 | 1 | 0.1475 | 0.0200 | 0.8903 |
| time*the amount of formic acid | 8.4325 | 1 | 8.4325 | 1.1453 | 0.3097 |
| time*the amount of ethyl acetate | 3.9534 | 1 | 3.9534 | 0.5370 | 0.4805 |
| the amount of formic acid* the amount of ethyl acetate | 14.6962 | 1 | 14.6962 | 1.9961 | 0.1881 |
| Residual | 73.6265 | 10 | 7.3626 | | |
| total | 635.6047 | 24 | | | |

Effect of Variables to Hemicellulose Removal

The analysis of variance (ANOVA) shows that temperature, temperature power two, time, the amount of formic acid, and the amount of ethyl acetate significantly affected the hemicellulose removal which can be seen from P value that was lower than 0.05 (P<0.05) as shown in table 11.

Figure 10:
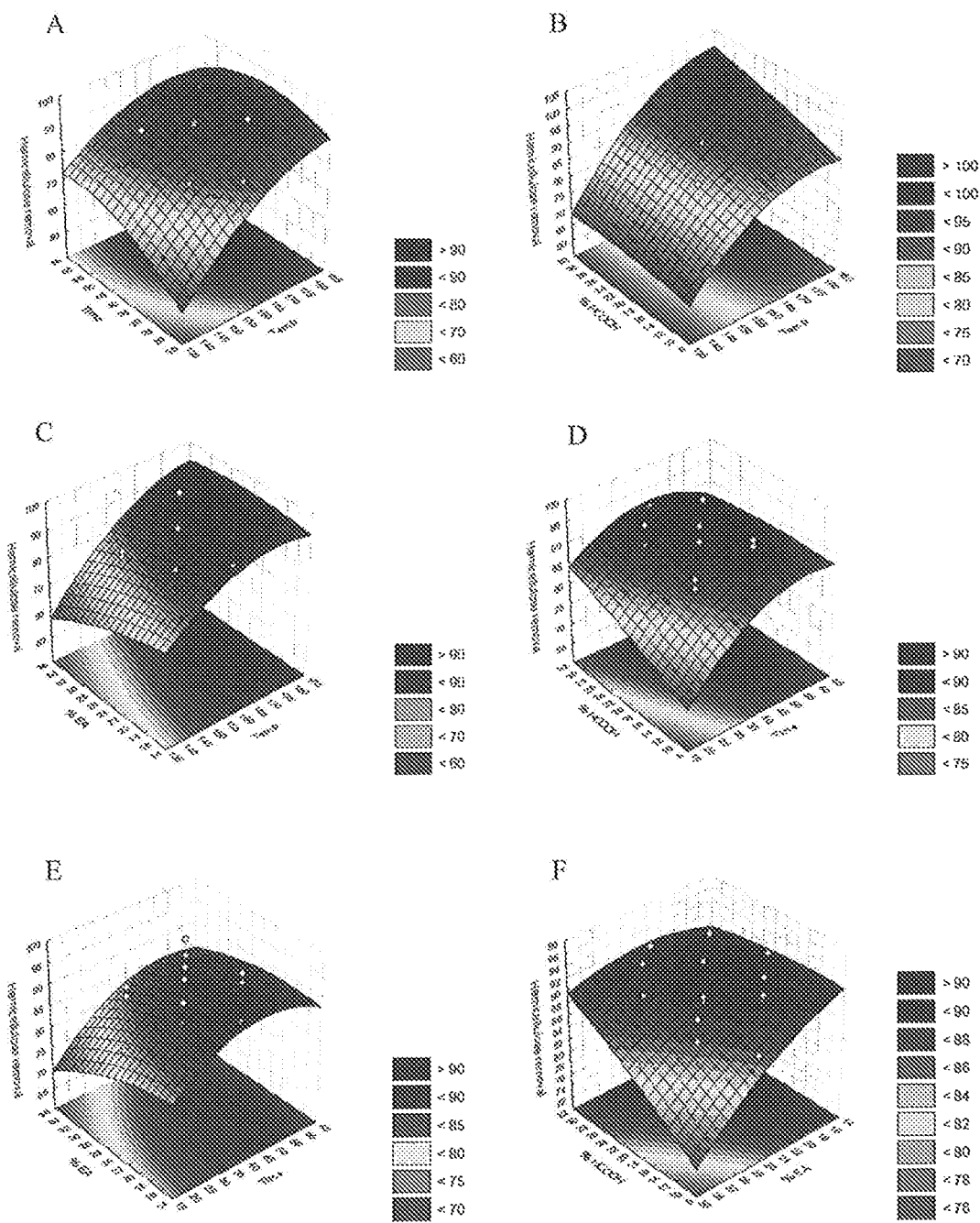
FIG. 10 shows response surface area that represents effect of variables to hemicellulose removal percentage from solid fraction comparing to the hemicellulose quantity in starting biomass (Temp is temperature; Time is time; HCOOH is formic acid; and EA is ethyl acetate):
  (a) effect of temperature and time when the quantity of formic acid and ethyl acetate are fixed at center point;
  (b) effect of temperature and formic acid when time and the quantity of ethyl acetate are fixed at the center point;
  (c) effect of temperature and the quantity of ethyl acetate when time and the quantity of formic acid are fixed at the center point;
  (d) effect of time and the quantity of formic acid when the temperature and the quantity of ethyl acetate are fixed at the center point;
  (e) effect of time and the quantity of ethyl acetate when the temperature and the quantity of formic acid are fixed at the center point;
  (f) effect of quantity of the quantity of formic acid and ethyl acetate when the temperature and time are fixed at the center point.

From said analysis data, the correlation of variables to hemicellulose removal in response surface can be shown in FIG. 10 and correlation equation of variables to hemicellulose removal can be acquired as following:

Hemicellulose removal=$89.38847+10.73493A-2.42983A^2+3.99649B-2.07151B^2+2.71207C-0.31563C^2-3.83649D-0.95184D^2-1.65683AB+0.85786AC+1.73912AD-1.24598BC+0.80047BD+1.57243CD$;

When A represents temperature, B represents time, C represents the amount of formic acid, and D represents the amount of ethyl acetate.

From FIG. 10 and above equation, the maximum hemicellulose removal can be predicted as 93.5 at 168.5° C., 46.7 min, 11.7% formic acid, and 13.4% ethyl acetate, which was close to value obtained from experiment at said condition which was 91.4.

TABLE 11

Effect of variables to hemicellulose removal by the analysis of variance

| Source of Variances | Sum of Squares | Degree of Freedom | Means Square | F Statistic | P Value |
|---|---|---|---|---|---|
| temperature | 691.4330 | 1 | 691.4330 | 233.0940 | 0.0000 |
| temperature · temperature | 16.6700 | 1 | 16.6700 | 5.6199 | 0.0392 |
| time | 95.8310 | 1 | 95.8310 | 32.3065 | 0.0002 |
| time · time | 12.1160 | 1 | 12.1160 | 4.0846 | 0.0709 |
| the amount of formic acid | 44.1320 | 1 | 44.1320 | 14.8776 | 0.0032 |
| the amount of formic acid · the amount of formic acid | 0.2810 | 1 | 0.2810 | 0.0948 | 0.7644 |
| the amount of ethyl acetate | 88.3120 | 1 | 88.3120 | 29.7710 | 0.0003 |
| the amount of ethyl acetate · the amount of ethyl acetate | 2.5580 | 1 | 2.5580 | 0.8624 | 0.3749 |
| temperature · time | 10.9800 | 1 | 10.9800 | 3.7017 | 0.0833 |
| temperature · the amount of formic acid | 2.9440 | 1 | 2.9440 | 0.9924 | 0.3427 |
| temperature · the amount of ethyl acetate | 12.0980 | 1 | 12.0980 | 4.0785 | 0.0710 |
| time · the amount of formic acid | 6.2100 | 1 | 6.2100 | 2.0935 | 0.1785 |
| time · the amount of ethyl acetate | 2.5630 | 1 | 2.5630 | 0.8640 | 0.3745 |
| the amount of formic acid · the amount of ethyl acetate | 9.8900 | 1 | 9.8900 | 3.3341 | 0.0978 |
| Residual | 29.6630 | 10 | 2.97 | | |
| total | 1025.092 | 24 | | | |

BEST MODE OR PREFERRED EMBODIMENT OF THE INVENTION

Best mode or preferred embodiment of the invention is as provided in the description of the invention.

The invention claimed is:

1. A process for fractionation of lignocellulosic biomass by contacting lignocellulosic biomass with a treatment liquid in a close system at a temperature not over 200° C. and a pressure of from 5 to 20 bars, the treatment liquid comprising:
   a water-miscible part, comprising formic acid, alcohol, and water; and
   a water-immiscible part, comprising alkyl acetate;
   wherein the weight based ratio of the water-miscible part to the water-immiscible part of the treatment liquid is from 7.5:2.5 to 9.2:0.8.

2. The process for fractionation of lignocellulosic biomass according to claim 1, wherein proportion of formic acid is from 10 to 35% weight by weight of water-miscible treatment liquid.

3. The process for fractionation of lignocellulosic biomass according to claim 2, wherein proportion of formic acid is from 15 to 25% weight by weight of water-miscible treatment liquid.

4. The process for fractionation of lignocellulosic biomass according to claim 1, wherein proportion of alcohol is from 20 to 40% weight by weight of water-miscible treatment liquid.

5. The process for fractionation of lignocellulosic biomass according to claim 1, wherein alcohol is selected from ethanol, methanol, or mixture thereof.

6. The process for fractionation of lignocellulosic biomass according to claim 1, wherein proportion of water is from 35 to 65% weight by weight of water-miscible treatment liquid.

7. The process for fractionation of lignocellulosic biomass according to claim 1, wherein alkyl acetate is selected from ethyl acetate, propyl acetate, butyl acetate, iso-butyl acetate, amyl acetate, iso-amyl acetate, hexyl acetate, 2-ethylhexyl acetate, or mixture thereof.

8. The process for fractionation of lignocellulosic biomass according to claim 7, wherein alkyl acetate is ethyl acetate.

9. The process for fractionation of lignocellulosic biomass according to claim 1, wherein the temperature of said process is from 140 to 180° C.

10. The process for fractionation of lignocellulosic biomass according to claim 9, wherein the temperature of said process is from 155 to 170° C.

11. The process for fractionation of lignocellulosic biomass according to claim 1, wherein the contacting time of the lignocellulosic biomass to the treatment liquid is not over 90 minutes.

12. The process for fractionation of lignocellulosic biomass according to claim 11, wherein the contacting time of the lignocellulosic biomass to the treatment liquid is from 25 to 60 minutes.

13. The process for fractionation of lignocellulosic biomass according to claim 1, wherein the percentage of lignocellulosic biomass is from 5 to 15% dry weight by volume of the treatment liquid.

14. The process for fractionation of lignocellulosic biomass according to claim 1, wherein the particle size of the lignocellulosic biomass is less than 425 µm.

15. The process for fractionation of lignocellulosic biomass according to claim 1, further comprising stirring at 50 to 250 rpm.

16. The process for fractionation of lignocellulosic biomass according to claim 1, further comprising digesting solid cellulose by cellulase or hemicellulase enzyme into sugar.

17. The process for fractionation of lignocellulosic biomass according to claim 1, further comprising of washing solids with water until pH of washing water is in the range of 4 to 6.

18. The process for fractionation of lignocellulosic biomass according to claim 1, wherein the lignocellulosic biomass is selected from rice straw, bagasse, corncobs, corn stem, palm waste, grass, pineapple shell, bamboo, or mixture thereof.

19. A process for fractionation of lignocellulosic biomass, said process comprising:

contacting lignocellulosic biomass with a treatment liquid in a close system at a temperature not over 200° C. and a pressure of from 5 to 20 bars; and stirring the lignocellulosic biomass and treatment liquid at 50 to 250 rpm;

wherein the treatment liquid comprises:

a water-miscible part, comprising formic acid, alcohol, and water; and a water-immiscible part, comprising alkyl acetate; and wherein the weight based ratio of the water-miscible part to the water-immiscible part of the treatment liquid is from 7.0:3.0 to 9.5:0.5.

20. A process for fractionation of lignocellulosic biomass, said process comprising:

contacting lignocellulosic biomass with a treatment liquid in a close system at a temperature not over 200° C. and a pressure of from 5 to 20 bars; and digesting solid cellulose by cellulase or hemicellulase enzyme into sugar;

wherein the treatment liquid comprises:

a water-miscible part, comprising formic acid, alcohol, and water; and a water-immiscible part, comprising alkyl acetate; and wherein the weight based ratio of the water-miscible part to the water-immiscible part of the treatment liquid is from 7.0:3.0 to 9.5:0.5.

* * * * *